United States Patent
Alpan et al.

(10) Patent No.: US 10,364,678 B2
(45) Date of Patent: Jul. 30, 2019

(54) THERMAL SHIELDING IN A GAS TURBINE

(71) Applicant: ROLLS-ROYCE plc, London (GB)

(72) Inventors: Bogachan Alpan, Derby (GB); Keith C. Sadler, Bristol (GB); David J. Hunt, Lichfield (GB)

(73) Assignee: ROLLS-ROYCE plc, London (GB)

( * ) Notice: Subject to any disclaimer, the term of this patent is extended or adjusted under 35 U.S.C. 154(b) by 425 days.

(21) Appl. No.: 15/202,120

(22) Filed: Jul. 5, 2016

(65) Prior Publication Data
US 2017/0022817 A1 Jan. 26, 2017

(30) Foreign Application Priority Data
Jul. 21, 2015 (GB) .................................. 1512810.1

(51) Int. Cl.
*F01D 5/08* (2006.01)
*F01D 5/18* (2006.01)
(Continued)

(52) U.S. Cl.
CPC ............. *F01D 5/081* (2013.01); *F01D 5/082* (2013.01); *F01D 5/187* (2013.01); *F01D 5/3015* (2013.01);
(Continued)

(58) Field of Classification Search
CPC .......... F01D 5/081; F01D 5/082; F01D 5/084; F01D 5/087; F01D 5/088
See application file for complete search history.

(56) References Cited

U.S. PATENT DOCUMENTS

| | | | |
|---|---|---|---|
| 2006/0292006 A1* | 12/2006 | Naik | F01D 5/081 416/97 R |
| 2012/0134845 A1* | 5/2012 | Khanin | F01D 5/187 416/97 R |

(Continued)

FOREIGN PATENT DOCUMENTS

| | | | |
|---|---|---|---|
| DE | 10 2004 002 327 A1 | 8/2005 | |
| EP | 0340149 A1 * | 11/1989 | ............. F01D 5/081 |

(Continued)

OTHER PUBLICATIONS

Nov. 29, 2016 Search Report issued in European Patent Application No. 16177882.

(Continued)

*Primary Examiner* — Justin D Seabe
*Assistant Examiner* — Jason Mikus
(74) *Attorney, Agent, or Firm* — Oliff PLC

(57) ABSTRACT

A turbine blade having labyrinth of internal channels for circulation of coolant, the novel labyrinth geometry includes; inlet arranged on axially upstream face of terminal portion leading to an upstream duct portion having first section adjacent the inlet and a second section, the second section having reduced cross section compared to first section; a first passage intersecting first section and extending through the blade body towards tip of the blade, a proximal end of leading edge passage arranged to capture incoming air flow; a main blade passage intersecting a downstream duct portion, the downstream duct portion arranged in axial alignment with the upstream duct portion but separate from upstream duct portion; and a restrictor passage intersecting with the mid-blade passage and extending towards a mid-blade duct portion, the mid-blade duct portion in axial alignment with the upstream and down- (Continued)

stream duct portions and in fluid communication with the upstream duct portion.

16 Claims, 9 Drawing Sheets

(51) Int. Cl.
  *F01D 5/30* (2006.01)
  *F02K 3/06* (2006.01)
  *F01D 11/00* (2006.01)
(52) U.S. Cl.
  CPC .............. *F01D 11/006* (2013.01); *F02K 3/06* (2013.01); *F05D 2220/323* (2013.01); *F05D 2240/301* (2013.01)

(56) References Cited

U.S. PATENT DOCUMENTS

| | | |
|---|---|---|
| 2012/0315150 A1 | 12/2012 | Umehara et al. |
| 2014/0234070 A1 | 8/2014 | Srinivasan et al. |

FOREIGN PATENT DOCUMENTS

| | | |
|---|---|---|
| EP | 1921255 A2 | 5/2008 |
| WO | 99/47792 A1 | 9/1999 |

OTHER PUBLICATIONS

Dec. 18, 2015 Search Report issued in British Patent Application No. 1512810.1.

\* cited by examiner (Prior Art)

THERMAL SHIELDING IN A GAS TURBINE

FIELD OF THE DISCLOSURE

The present disclosure concerns thermal shielding in a gas turbine, more particularly, thermal shielding of the bucket groove where a turbine blade root meets the turbine disc. It also concerns control of leakage flow between the bucket groove and a terminal portion of the blade root.

BACKGROUND

In a gas turbine engine, ambient air is drawn into a compressor section. Alternate rows of stationary and rotating aerofoil blades are arranged around a common axis, together these accelerate and compress the incoming air. A rotating shaft drives the rotating blades. Compressed air is delivered to a combustor section where it is mixed with fuel and ignited. Ignition causes rapid expansion of the fuel/air mix which is directed in part to propel a body carrying the engine and in another part to drive rotation of a series of turbines arranged downstream of the combustor. The turbines share rotor shafts in common with the rotating blades of the compressor and work, through the shaft, to drive rotation of the compressor blades.

It is well known that the operating efficiency of a gas turbine engine is improved by increasing the operating temperature. The ability to optimise efficiency through increased temperatures is restricted by changes in behaviour of materials used in the engine components at elevated temperatures which, amongst other things, can impact upon the mechanical strength of the blades and rotor disc which carries the blades. This problem is addressed by providing a flow of coolant through and/or over the turbine rotor disc and blades.

It is known to take off a portion of the air output from the compressor (which is not subjected to ignition in the combustor and so is relatively cooler) and feed this to surfaces in the turbine section which are likely to suffer damage from excessive heat. Typically the cooling air is delivered adjacent the rim of the turbine disc and directed to a port which enters the turbine blade body and is distributed through the blade, typically by means of a labyrinth of channels (not shown) extending through the blade body.

In one known arrangement, a duct is provided integral to the blade. The duct is arranged to pass through a terminal portion of the root (a region adjacent an end of the root which, in use, sits at a radially innermost end of a "bucket groove" in the rotor disc circumference which receives the root) with an inlet at an upstream face of the terminal portion and an end at or near the downstream face of the terminal portion. At its axially upstream face, the terminal portion is profiled to conform closely to the bucket groove profile and an inner wall defines the inlet which has a similar shape to the terminal portion at the upstream face. At its axially downstream end, the duct has a much smaller cross section, radially distanced from the bucket groove. An inner wall of the duct diverges from the downstream end of the duct to the inlet forming a continuous, inclined passage. In other arrangements, the duct walls may step down in size to produce a staged narrowing of the cross section. One or more cooling passages are provided within the blade body and extend from a root portion towards a tip portion of the blade body.

In some arrangements the cooling passages comprise a leading edge passage and a main blade or "multi-pass" passage. The leading edge passage extends root to tip adjacent the leading edge of the blade. The "multi-pass" passage is an elongate and convoluted passage which typically incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage). At the root portion end, the cooling passages are arranged to intersect with the duct. The leading edge passage may optionally connect with the main blade passage to provide a single "multi-pass" extending from leading edge to trailing edge.

In some arrangements, the multi-pass branches into two channels each of which intersect with the duct, one intersecting the duct at a position relatively upstream to the position at which the other intersects the duct. Optionally in such an arrangement, the duct is narrowed along a small segment between the two multi-pass branches and serves to meter flow to the downstream branch of the multi-pass, and hence the multi-pass channel itself. The narrowed section is provided with a smaller diameter than the inlets from the duct to both the upstream multi-pass branch and the leading edge passage so a predominance of flow towards the leading edge passage is encouraged. It will be appreciated that in order to allow for thermal expansion and manufacturing tolerances, there exists a small clearance space around an outer wall of the duct which faces the bucket groove.

In the described arrangements, a pressure drop occurs from the upstream end of the duct to the downstream end. A consequence of this drop can be to drive leakage flow through the clearance space between opposing faces of the terminal portion and the bucket groove. Heat transfer resulting from these leakage flows can increase thermal gradients in the turbine disc leading to the disc material being subjected to an increased stress range. The stress range to which the disc material is subjected is a limiting factor in the life of the disc.

SUMMARY OF INVENTION

According to embodiments of the invention there is provided a turbine blade having a body enclosing a labyrinth of internal channels for the circulation of coolant received through an inlet formed in a terminal portion of the blade root, the labyrinth comprising;

an inlet arranged on an axially upstream face of the terminal portion leading to a duct;

a first passage intersecting the duct at a first passage intersection and extending through the blade body towards the tip of the blade, a proximal end of the first passage being arranged, in use, to capture incoming coolant flow;

a second passage intersecting the duct at a second passage intersection at a position downstream of the first passage intersection;

in use, a clearance space between an external wall surface of the duct and a bucket groove of a disc hub in which the blade is carried, the clearance space creating a leakage path for air directed to the inlet;

the duct and/or the passage intersections configured to create a pressure drop in the duct in the direction from the inlet to the second passage intersection; and one or more duct vents provided in a wall of the terminal portion at a position downstream of a downstream edge of the first passage intersection, the one or more duct vents configured and arranged to balance the pressure of coolant in the duct with the pressure of coolant in the leakage path thereby reducing the mass flow of coolant entering the leakage path in a region of the clearance space extending between the duct vents and one end of the duct.

The terms upstream and downstream in this context refer to the direction of flow of coolant arranged to enter the inlet. This may be the same or an opposite direction to the direction of flow of a working fluid passing over the hub and blade in an operating gas turbine. The coolant may be air, for example in the case of a gas turbine engine, the coolant is air drawn from the compressor of the engine bypassing the combustor.

The first passage may be a leading edge passage or a trailing edge passage. The second passage may be a main blade passage or multipass. The second passage may be a trailing edge passage. There may be more than two passages. The first and second passage may join to form a single multi-pass having two intersections with the duct.

It will be understood that optimum duct vent geometry, size, positions and number will vary with the geometry, size and arrangement of the duct and duct passage intersections. It is well within the abilities of the skilled addressee to determine the pressure drop in a given duct/passage configuration and to identify duct vent arrangements which will provide a desired pressure balancing.

With an optimum configuration of duct vents, the pressure at the inlet and the main blade passage intersection can be equalised and leakage into the clearance space can be minimised.

One factor to consider in the duct vent geometry is to provide a preferable flow path for leakage flow entering the inlet and surrounding. This is achieved by providing the vent with a cross sectional area which is greater than the cross sectional area of the clearance space at the axially upstream face. For example, the cross sectional area of the duct vent is at least 1.2, more desirably at least 1.5 times the cross sectional area of the clearance space. More preferably the cross-sectional area of the duct vents is in the range 2-5 times greater than that of the clearance space.

The duct vents may be positioned on either an upstream side or a downstream side of the second passage intersection. If placed on an upstream side, this can alleviate the problem of thermal gradients to an upstream side of the disc. If placed on a downstream side, this can alleviate the problem of thermal gradients to a downstream side of the disc.

Optional configurations for the duct vent(s) include a single orifice of any geometry or a plurality of smaller orifices. The duct vent(s) may extend orthogonally to a longitudinal axis of the duct or may extend obliquely. The duct vents may be positioned in a portion of the duct wall substantially facing the main passage inlet (hereinafter "terminal wall") or in a portion of the wall which extends in a root to tip direction of the blade (hereinafter "side wall"). Vents may be positioned in different arrangements on the terminal wall or the side wall(s) or a combination thereof to protect the disc from unwanted flow impingement effects.

Where there is a plurality of duct vents, these may be arranged in a regular pattern or may be arranged more randomly. A plurality of duct vents may comprise duct vents of identical size and geometry, alternatively, the size and/or geometry of the duct vents may vary.

Duct vents can be machined into an existing blade (or duct wall portion, before or after the duct wall portion is joined or fastened to the blade). Alternatively, duct vents can be integrally cast into a blade or a cast duct wall portion by providing appropriate core geometry. In other options, some or all of the duct vents can be provided through an additive layer manufacturing method used to build some or the entire duct wall. Whilst other geometries are suitable for providing the desired pressure equalisation, convenient geometries for ease of manufacture are round holes and elongate slots.

Duct vents need not have linear walls, for example they may be curved to form a sinuous channel through the duct wall. The cross section of the duct vent may be of any practical shape and may be the same or vary as the vent passes through the duct wall.

The duct vents may be placed as close as possible to the second passage intersection on a downstream or upstream side. This can provide protection from the problematic thermal gradients over the largest hub section.

In embodiments described, the inlet is formed integrally with the blade in a single casting process. Alternative arrangements are contemplated where the inlet wall is defined by two or more components which are subsequently joined or fastened together. For example, a duct wall portion may be manufactured using an additive layer manufacturing method and be subsequently friction welded to a cast blade portion which defines the remainder of the duct wall.

BRIEF DESCRIPTION OF THE DRAWINGS

Some embodiments of the invention will now be described with reference to the accompanying Figures in which.

DETAILED DESCRIPTION

Figure 1:
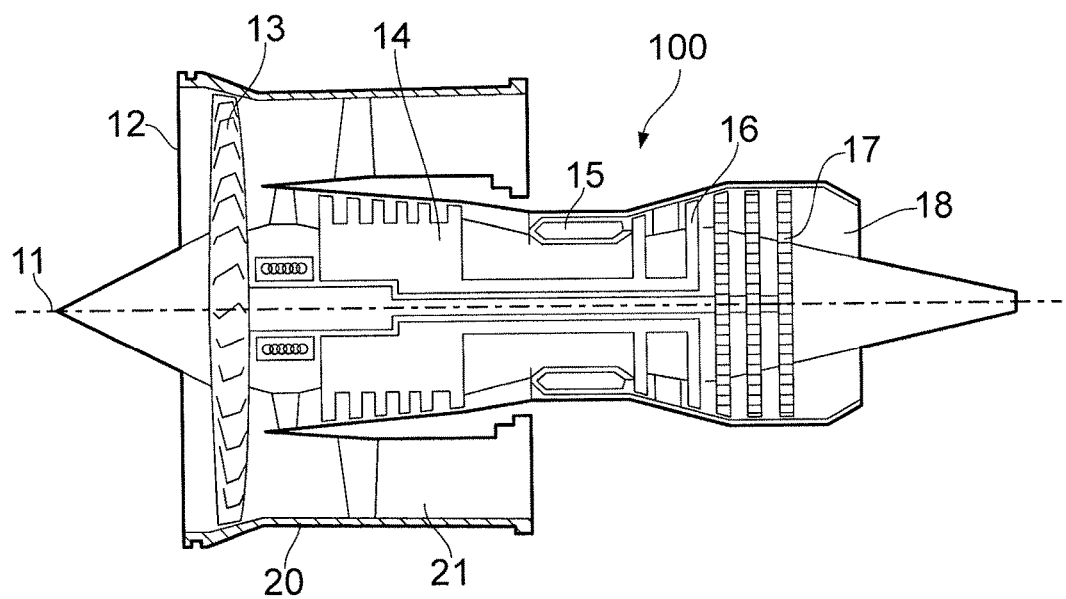
FIG. 1 is a sectional side view of a gas turbine engine.

With reference to FIG. 1, a gas turbine engine is generally indicated at 100, having a principal and rotational axis 11.

The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 100 and defines the intake 12.

The gas turbine engine 100 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Figure 2:
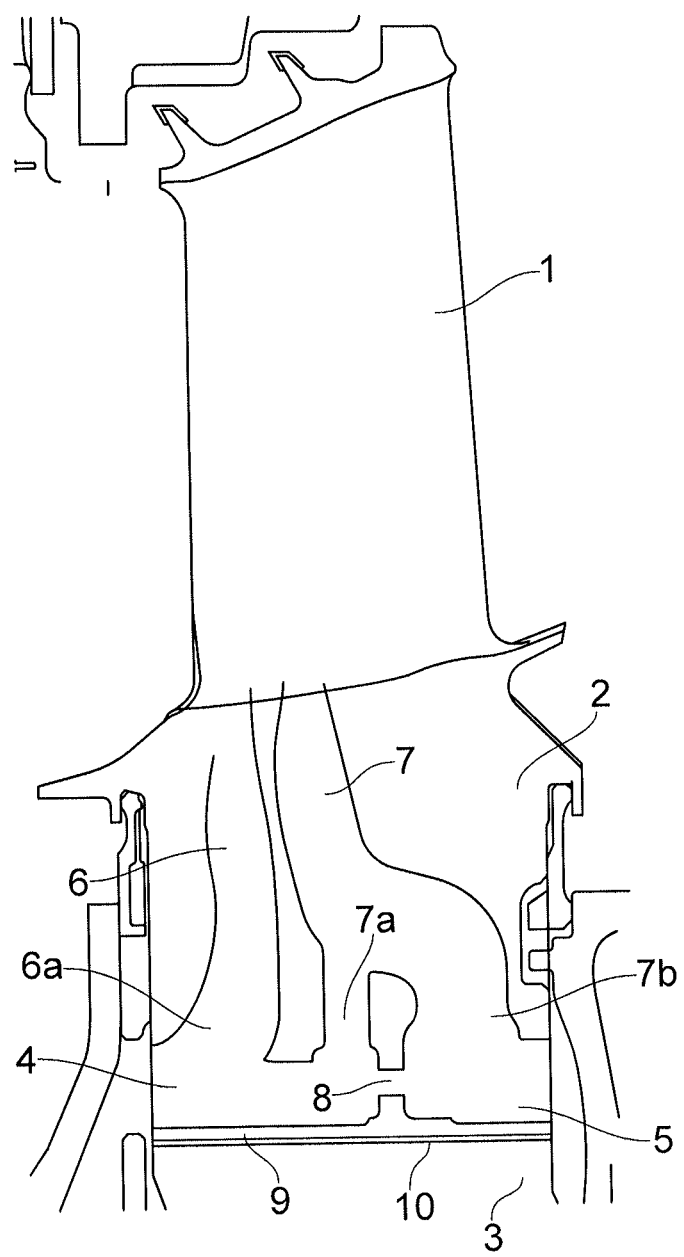
FIG. 2 is a cross section through the axis of a turbine blade incorporating a labyrinth arrangement.

As can be seen in FIG. 2 a turbine blade has a root portion 2, extending from a blade platform and an aerofoil section 1 extending from an opposite surface of the blade platform. A terminal portion of the root portion 1 is arranged in a recessed surface (bucket groove) in a turbine disc 3.

In an axially upstream face of the terminal portion is provided an inlet 4 leading to a duct which extends to a downstream end 5.

A leading edge passage 6 intersects the duct and extends through the root portion 2, into the aerofoil section 1 and onwards towards the tip of the blade. A proximal end of the leading edge passage 6a intersecting with the duct is angled, in use, towards the direction of incoming air flow.

The duct also intersects with a main blade passage or "multi-pass" 7. In this embodiment the multi-pass 7 has two branches 7a, 7b (though the invention remains applicable to embodiments with a single main blade passage intersection). A first branch 7a bends towards and intersects with a mid-section of the duct. At the intersection with the duct, the branch 7a is relatively narrow in cross section compared to the leading edge passage 6. A second branch 7b intersects with the duct towards the downstream end 5. The multi-pass 7 extends in a root to tip direction to the aerofoil section 1. Whilst not shown in the figure, typically the multi-pass 7 turns as it approaches the tip of the aerofoil section and returns back towards the root circulating cooling air through the aerofoil section 1 body and then turns back towards the tip and the trailing edge of the blade body.

In the duct, midway between the intersections of the first branch 7a with the second branch 7b, the duct narrows in cross section to form a channel 8. Coolant passing through channel 8 is delivered to second branch 7b and into multi-pass 7.

The channel 8 is relatively narrower in cross section than the first branch 7a at its intersection with the duct. Coolant air entering the inlet 4 can take any of three routes to escape the duct; the leading edge passage 6, the first branch 7a and the channel 8. An advantage of providing these two delivery routes (branch 7a and channel 8) for coolant to the main blade passage 7 is that the cross sections of the two can both be kept less than the cross sectional area of intersection with the leading edge passage 6. This achieves the main objective of providing a predominant coolant flow towards the leading edge passage whilst also metering the air into the main blade passage 7 in a controlled manner by selectively choosing the size of channel 8. As a consequence of the flow exiting the duct further upstream, there is a pressure drop between the inlet 4 and downstream of channel 8.

Figure 3:
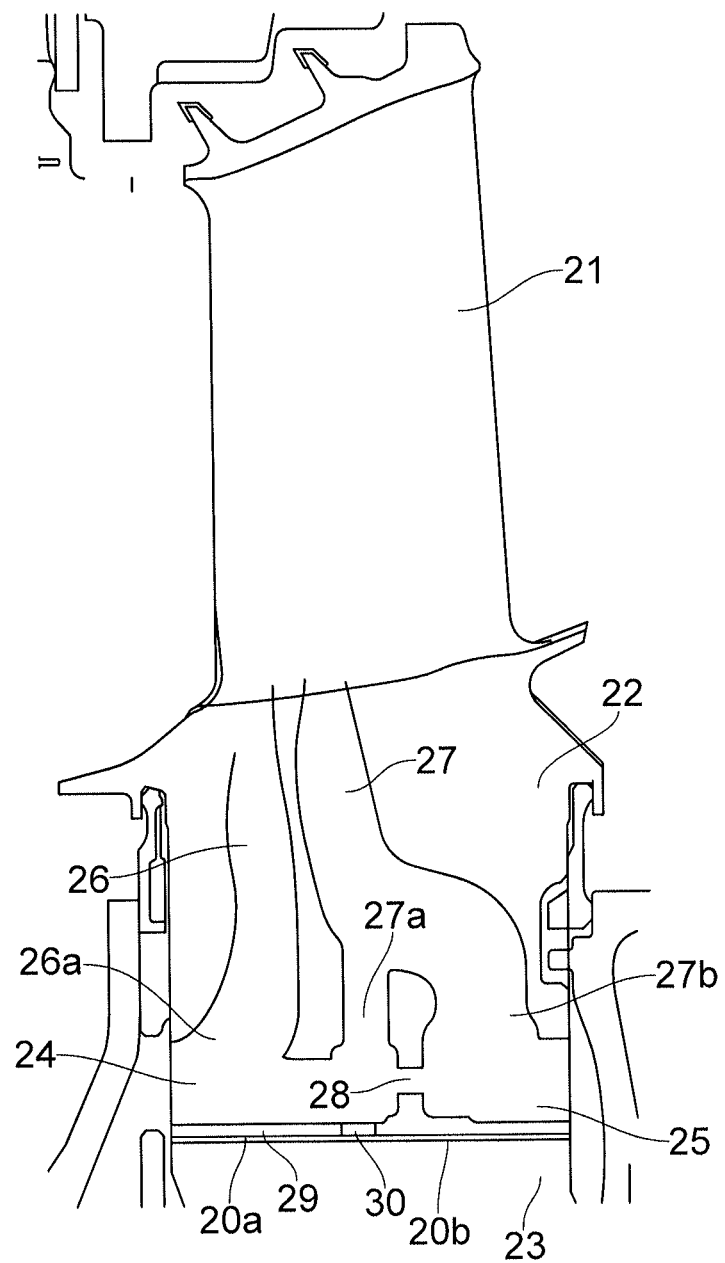
FIG. 3 is a cross section through the axis of a turbine blade incorporating a labyrinth arrangement in accordance with a first embodiment of the invention.

FIG. 3 shows a first embodiment of the invention. The figure shows a blade having substantially similar internal geometry to that of FIG. 2. In the figure, features in common with the blade of FIG. 2 are given the same reference numerals preceded by the numeral 2. It can be seen that there is a small clearance space 20a, 20b which extends between a terminal wall 29 of the root portion 22 and the disc 23. The clearance space has an upstream portion 20a which sits upstream of a vent 30 and a downstream portion (20b) which sits downstream of the vent 30. As is known in the prior art, leakage air is drawn through this clearance space 20a, 20b due to the previously explained pressure differential between the inlet 4 and downstream of the channel 8. In excess, this can create undesirable thermal gradients in the disc 23 which can reduce the operational life of the disc 23.

In order to equalise pressure between the inlet 24 and the channel 28, without upsetting the predominant flow of coolant towards the leading edge passage 26, a vent in the form of orifice 30 is provided in the wall 29. The vent is positioned upstream of the intersection with the leading edge passage 26 and just downstream of the channel 28, facing the entrance to the first branch 27a of the multi-pass 7. The pressure differential between the inlet 24 and orifice (duct vent) 30 is relatively small since the position of the orifice 30 is upstream of the channel 8. Therefore an adequately designed vent 30 equalises the pressure upstream and downstream of the channel portion 20a which sits upstream of the vent 30. Additionally, the fluid recirculates when entering the vent 30 and creates a mini vortex which opposes the flow in upstream channel portion 20a. These effects result in the presence of leakage air in the clearance space upstream portion 20a and its consequent undesirable impact on the disc 23 being reduced. The configuration and positioning of the vent 30 is selected so as to minimize the leakage flow in the clearance space upstream portion 20a, and thereby improve disc life without significant impact on heat transfer coefficients which could result due to the flow impingement caused by the mini vortex. A single large orifice 30 can conveniently be machined into a cast blade. Alternatively, the core geometry for a blade may be adapted so as to provide the orifice 30 in the cast blade.

The skilled addressee will understand that a wide variety of vent configurations are possible to achieve the desired effect. Other factors may influence the configuration chosen, for example, ease of manufacture or relative location of adjacent components.

Figure 7:
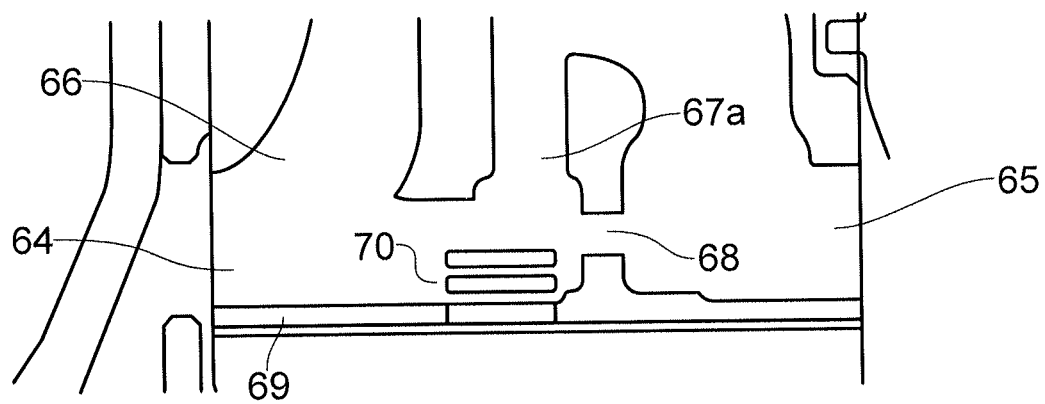
FIG. 7 is a cross section through the axis of a turbine blade incorporating a labyrinth arrangement in accordance with a fifth embodiment of the invention.
Figure 8:
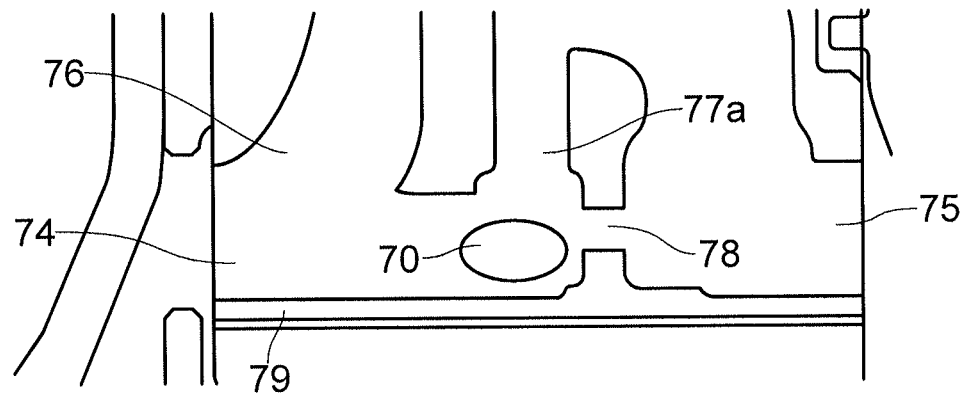
FIG. 8 is a cross section through the axis of a turbine blade incorporating a labyrinth arrangement in accordance with a sixth embodiment of the invention.
Figure 9:
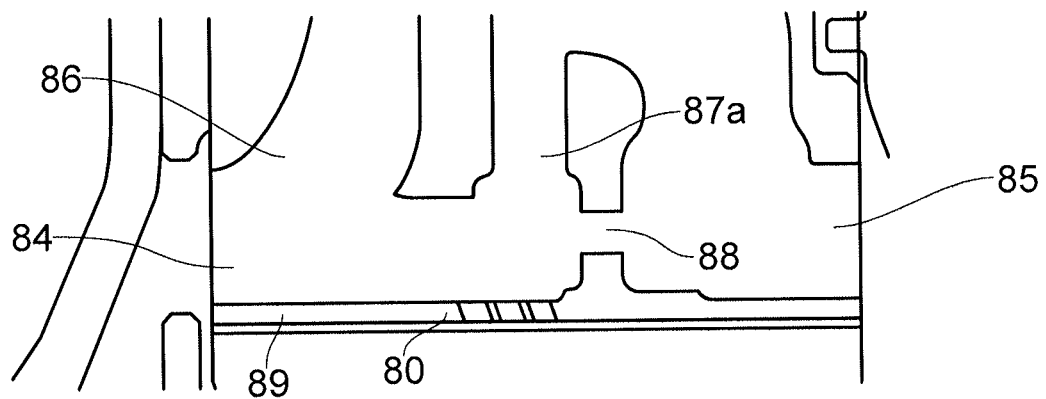
FIG. 9 is a cross section through the axis of a turbine blade incorporating a labyrinth arrangement in accordance with a seventh embodiment of the invention.

Further examples of suitable vent configurations are shown in FIGS. 4 to 9. The figures each show a blade having substantially similar internal geometry to that of FIG. 2. In each figure, features in common with the blade of FIG. 2 are given the same reference numerals preceded by the numeral; 3 (FIG. 4), 4 (FIG. 5), 5 (FIG. 6), 6 (FIG. 7), 7 (FIG. 8) or 8 (FIG. 9).

Figure 4:
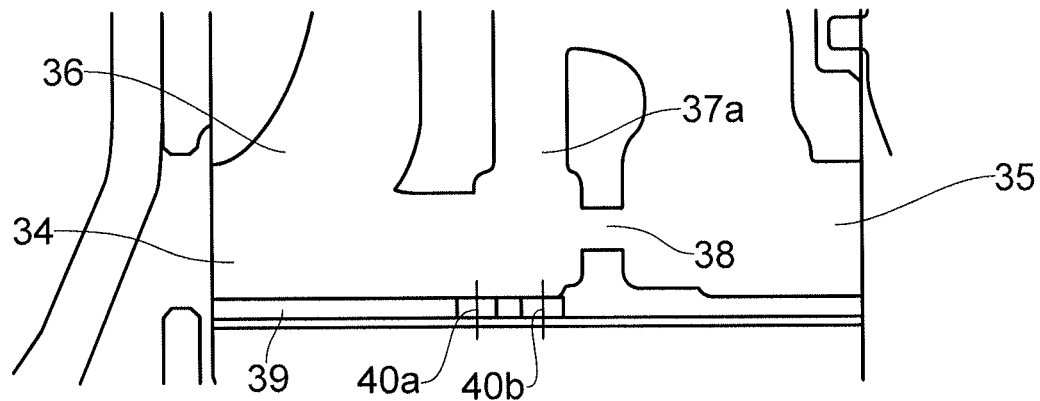
FIG. 4 is a cross section through the axis of a turbine blade incorporating a labyrinth arrangement in accordance with a second embodiment of the invention.

In FIG. 4, two slots 40a, 40b replace the single orifice 30 of the embodiment of FIG. 3.

Figure 5:
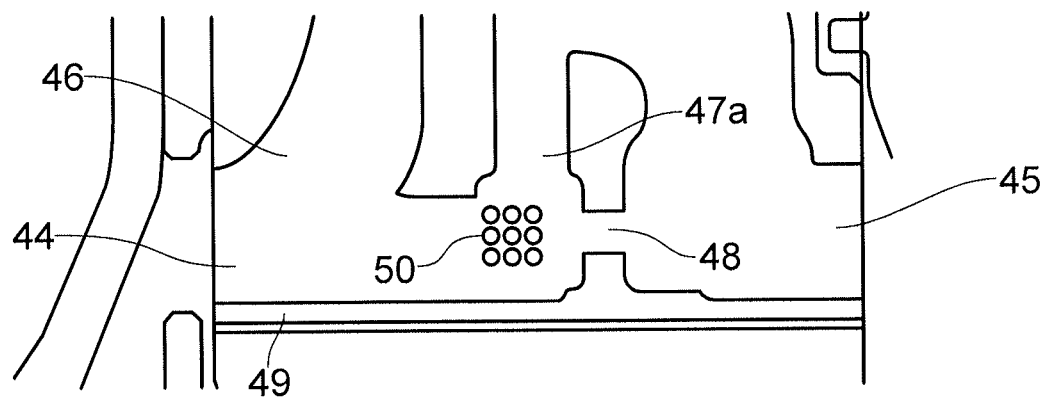
FIG. 5 is a cross section through the axis of a turbine blade incorporating a labyrinth arrangement in accordance with a third embodiment of the invention.

In FIG. 5 venting is provided by an array of relatively smaller holes 50 which are provided in a side wall (extending from root to tip) of the duct.

Figure 6:
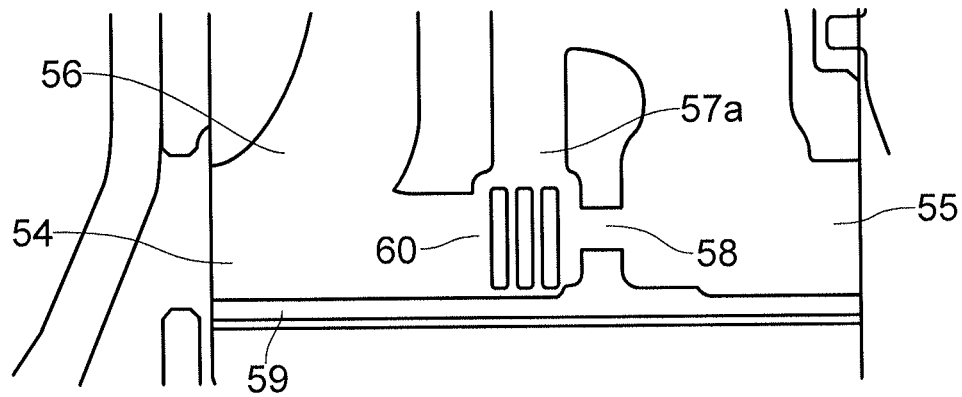
FIG. 6 is a cross section through the axis of a turbine blade incorporating a labyrinth arrangement in accordance with a fourth embodiment of the invention.

In FIG. 6, three elongate slots 60 replace the holes 50 of FIG. 5.

In FIG. 7, venting is provided by elongate slots 70 having a longitudinal axis in parallel with that of the duct. The slots are arranged in both the terminal wall and a side wall of the duct.

In FIG. 8, an oval vent 80 is provided in a side wall, whilst not shown, a similar vent can be symmetrically arranged on an opposing side wall.

In FIG. 9, venting is provided in the form of holes 80 in the terminal wall. In this arrangement, the holes have an axis which is inclined to the orthogonal of the terminal wall 89 axis.

Figure 10:
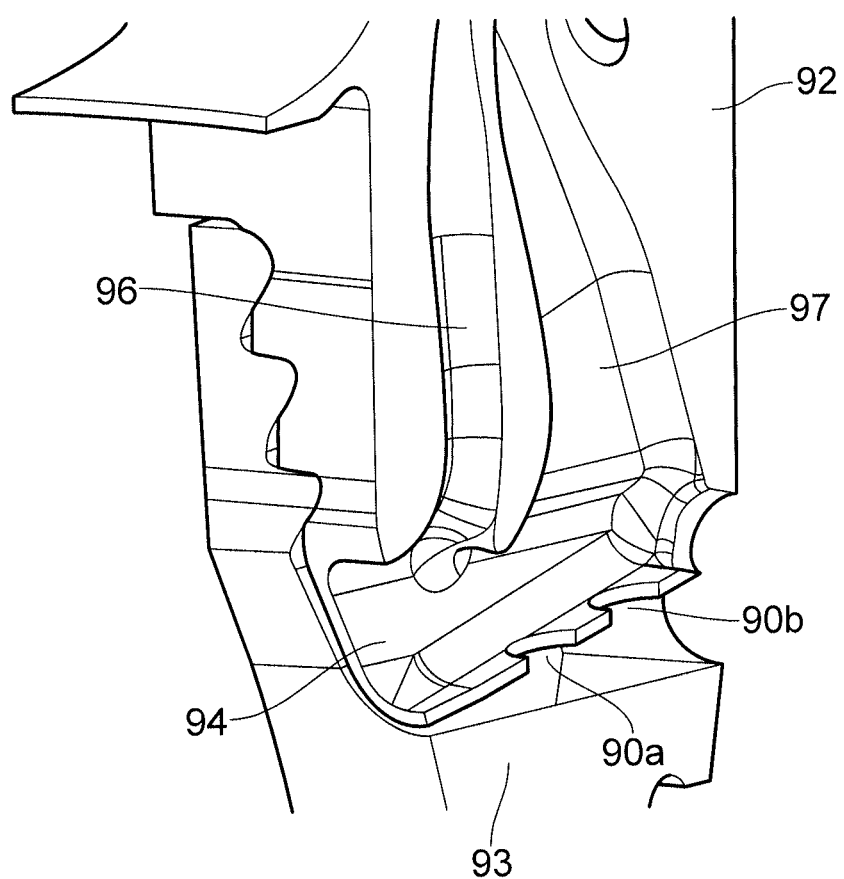
FIG. 10 is a cross section through the axis of a turbine blade incorporating a labyrinth arrangement in accordance with an eighth embodiment of the invention.

FIG. 10 shows a blade having a different internal geometry to the already described embodiments but which still benefits from the invention. The blade has a terminal portion 92 which locates in a bucket groove of a disc 93. A duct has an inlet 94 and intersects with leading edge passage 96 and main blade passage 97. It is provided with vents 90a and 90b which face the intersection with the main blade passage 97.

Figure 11:
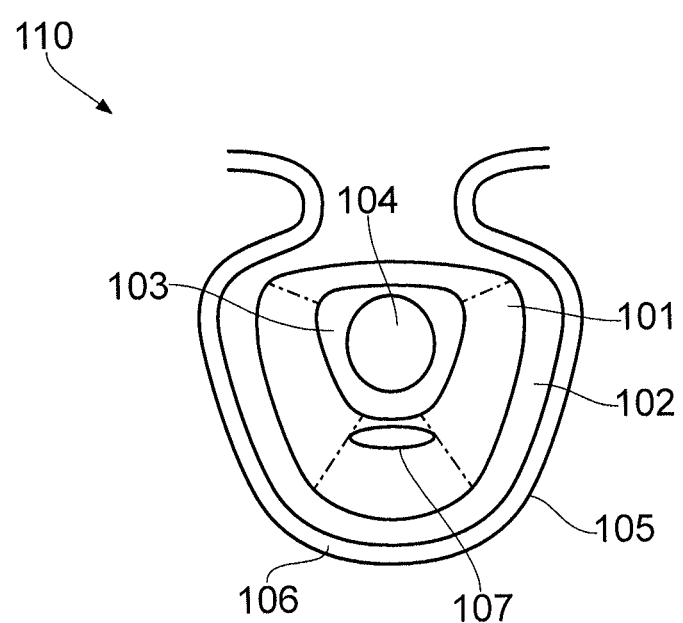
FIG. 11 shows a schematic view from an upstream face of a terminal portion of a blade in accordance with an embodiment of the invention.

As shown in FIG. 11, an upstream face of a terminal portion of a blade 100 has a duct inlet 101 defined by a duct wall 102. Downstream of the duct inlet 101, the duct wall narrows 103 to define a narrower duct portion having an inlet 104. The terminal portion is received in a bucket groove defined by a wall 105 of a turbine hub. The two walls 102, 105 are separated by a clearance space 106. When coolant is directed to the inlet 101, some is also drawn to the leakage path provided by the clearance space 106. Due to the narrowing of the duct at the inlet 104 (which has a smaller cross-sectional area than the inlet 101), there is a pressure drop along the duct axis between these two inlets. A duct vent 107 is provided through duct wall 102 providing a passage between the duct and the clearance space 106. The duct vent 107 has a larger flow area than the clearance space 106 and so creates a preferable flow path for coolant delivered to the inlet. Rather than pass into clearance space 106 at the upstream face, leakage coolant is persuaded to enter the inlet and exit through the duct vent 107. This reduces the occurrence of leakage coolant in the clearance space between the upstream face and the position of the duct vent 107 protecting the adjacent section of the hub from undesirable thermal gradients.

Figure 12:
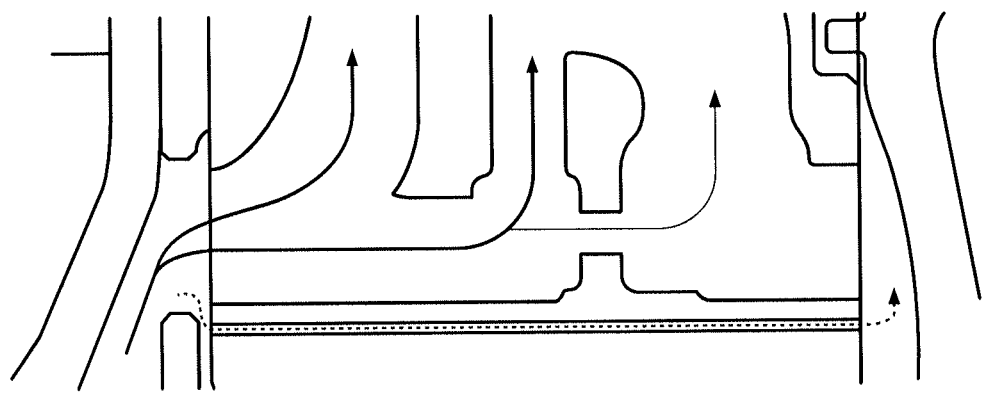
FIG. 12 shows a comparison of coolant flow through a prior art blade geometry and a comparable blade geometry which has been adapted in accordance with an embodiment of the invention.
Figure 12:
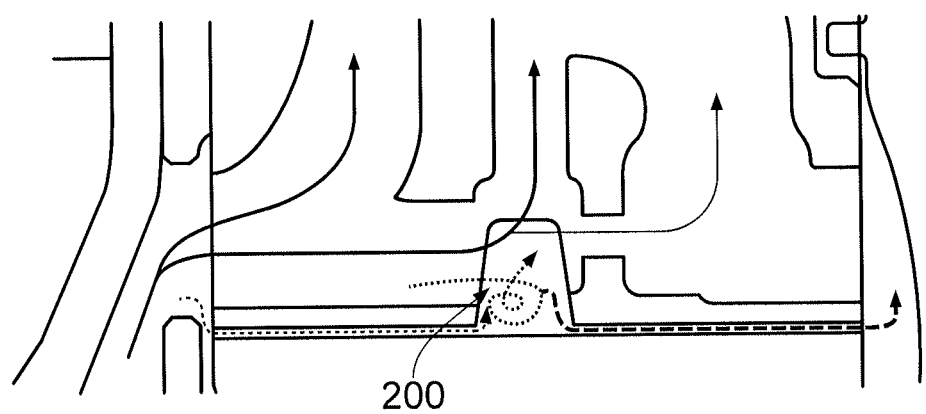

FIG. 12 shows a comparison of a prior art blade with a blade of similar geometry adapted to include a duct vent 200 in accordance with the invention. The geometries are broadly similar to those illustrated in FIGS. 2 to 9. The flow of coolant through the two arrangements is shown by the arrows. Two categories of flow can be seen; duct coolant which enters the duct inlet at the upstream face and passes on through the duct, and leakage coolant which enters the clearance space at the upstream face and continues its passage along the clearance space.

The width of the arrows is indicative of the proportion of coolant taking the path, though the relative proportions between leakage coolant and duct coolant are not accurate (in practice there is a far greater dominance of coolant flow to the inlet compared to the clearance space). The dashed arrows represent the flow of leakage coolant and the solid arrows duct coolant. In the lower figure, which represents an embodiment in accordance with the invention, a third category of flow is represented by a dotted arrow. This dotted arrow represents additional duct coolant which, in the prior art arrangement would have formed part of the leakage flow.

With reference to the prior art arrangement, coolant approaching the upstream face of the terminal portion passes predominantly into the inlet with a small portion entering the clearance space. Duct coolant is then divided between downstream inlets to the various passages which carry the coolant in a root to tip direction to cool the blade body. As is illustrated by the arrow dimensions, the differently proportioned inlets encourage flow predominantly towards a passage adjacent the leading edge of the blade. Remaining coolant flow passes through two smaller inlets and is delivered to two branches of a multi-pass. As discussed previously, a pressure drop along the duct can make the clearance space path more favourable for this portion of coolant. It can be seen that the leakage flow is of consistent magnitude along the clearance space.

By comparison, in the adapted arrangement, the leakage flow entering the clearance space at the upstream face is reduced and added to the coolant flow along a first portion of the duct. When the coolant flow approaches the duct vent 200, the relatively larger orifice compared to the adjacent inlets presents a more favourable path for the leakage flow. This is represented by the wider, dashed arrow in the clearance space downstream of the duct vent 200. By reducing the leakage flow at the upstream end of the clearance space, the adjacent disc is made less vulnerable to undesirable thermal gradients associated with the leakage flow. The useful life of the disc can thus be improved.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A turbine blade having a body enclosing a labyrinth of internal channels for the circulation of coolant received through an inlet formed in a terminal portion of a blade root, the labyrinth comprising;

the inlet arranged on an axially upstream face of the terminal portion leading to a duct;

a first passage intersecting the duct at a first passage intersection and extending through the body towards a tip of the turbine blade, a proximal end of the first passage being arranged, in use, to capture incoming coolant flow;

a second passage intersecting the duct at a second passage intersection at a position downstream of the first passage intersection, the first passage intersection and the second passage intersection having different cross-sectional areas whereby to create a pressure drop along the duct;

in use, a clearance space between an external wall surface of the duct and a bucket groove of a disc hub in which the turbine blade is carried, the clearance space creating a leakage path for air directed to the inlet;

the duct and/or the passage intersections configured to create a pressure drop in the duct in the direction from the inlet to the second passage intersection; and one or more duct vents provided in a wall of the terminal portion at a position downstream of a downstream edge of the first passage intersection, the one or more duct vents having a total cross-sectional area greater than a cross sectional-area of the clearance space at an end of the clearance space adjacent to the inlet and the one or more duct vents are arranged to balance the pressure of coolant in the duct with the pressure of coolant in the leakage path thereby reducing the mass flow of coolant entering the leakage path in a region of the clearance space extending between the one or more duct vents and one end of the duct.

2. The turbine blade as claimed in claim 1, wherein the first passage intersection has a cross sectional area which is larger than that of the second passage intersection.

3. The turbine blade as claimed in claim 1, wherein the second passage branches into a first, upstream branch and a second, downstream branch which each intersect with the duct and wherein the duct has a portion of narrowed cross section between the two branches, the cross sectional area of the narrowed cross section is smaller than that of the intersection between the first branch and the duct, and the one or more duct vents is positioned at a position upstream of a downstream edge of the intersection with the first branch.

4. The turbine blade as claimed in claim 1, wherein the second passage is a multi-pass.

5. The turbine blade as claimed in claim 1 which comprises a single duct vent in the form of an orifice in a terminal wall of the terminal portion which faces the intersection between the duct and the second passage.

6. The turbine blade as claimed in claim 1 which comprises multiple duct vents.

7. The turbine blade as claimed in claim 6, wherein the multiple duct vents are round holes arranged in an array.

8. The turbine blade as claimed in claim 6, wherein the multiple duct vents are slots arranged in parallel alignment with the axis of the duct.

9. The turbine blade as claimed in claim 6, wherein the multiple duct vents are slots arranged in parallel alignment with each other but inclined or orthogonal to the axis of the duct.

10. The turbine blade as claimed in claim 1, wherein the one or more duct vents have an axis which inclines to the orthogonal of the axis of the duct.

11. The turbine blade as claimed in claim 1, wherein the one or more duct vents are arranged in a terminal wall of the duct only.

12. The turbine blade as claimed in claim 1, wherein the one or more duct vents are arranged in one or both side walls of the duct.

13. The turbine blade as claimed in claim 1, wherein the one or more duct vents form part of a geometry cast into the turbine blade.

14. The turbine blade as claimed in claim 1, wherein the one or more duct vents have been machined into a cast body.

15. The turbine blade as claimed in claim 1, wherein the first passage is a leading edge passage and the second passage is a main blade passage or multi-pass.

16. The turbine blade as claimed in claim 1, wherein the one or more duct vents are arranged to reduce the mass flow of coolant entering the leakage path in a region of the clearance space extending between the one or more duct vents and a downstream end of the duct.

* * * * *